(12) United States Patent
Neuhauser et al.

(10) Patent No.: US 11,309,830 B2
(45) Date of Patent: Apr. 19, 2022

(54) MOUNTING SYSTEM AND A METHOD FOR MOUNTING PHOTOVOLTAIC MODULES

(71) Applicant: Hanwha Q CELLS GmbH, Bitterfeld-Wolfen (DE)

(72) Inventors: Franz Neuhauser, Falkensee (DE); Heiko Molitor, Leipzig (DE); Henning Busse, Leipzig (DE); Marc Dewenter, Halle (DE); Thomas Ebenroth, Bitterfeld-Wolfen (DE); Thomas Linke, Oranienbaum-Woerlitz OT Kakau (DE)

(73) Assignee: Hanwha Q CELLS GmbH, Bitterfeld-Wolfen (DE)

( * ) Notice: Subject to any disclaimer, the term of this patent is extended or adjusted under 35 U.S.C. 154(b) by 534 days.

(21) Appl. No.: 15/891,140

(22) Filed: Feb. 7, 2018

(65) Prior Publication Data

US 2018/0226916 A1    Aug. 9, 2018

(30) Foreign Application Priority Data

Feb. 8, 2017    (EP) ..................... 17155195

(51) Int. Cl.
*H02S 30/10*    (2014.01)
*H02S 30/00*    (2014.01)
(Continued)

(52) U.S. Cl.
CPC ............ *H02S 30/10* (2014.12); *F24S 25/632* (2018.05); *H02S 30/00* (2013.01); *F24S 2025/6007* (2018.05); *Y02E 10/47* (2013.01)

(58) Field of Classification Search
CPC ... Y02E 10/47; F24S 2025/6007; F24S 25/30; F24S 25/60; F24S 25/63;
(Continued)

(56) References Cited

U.S. PATENT DOCUMENTS 8,567,134 B1    10/2013   Grushkowitz et al.
2004/0221524 A1*    11/2004   Poddany ............... F24S 25/632
                                                              52/204.5
(Continued)

FOREIGN PATENT DOCUMENTS

DE    10 2010 021 713 A1    12/2011
DE    102010021713 A1 *    12/2011    ............. H02S 20/00
(Continued)

OTHER PUBLICATIONS

English machine translation of Hirata et al. (JP 2010-027979) published on Feb. 4, 2010.*

*Primary Examiner* — Christina Chern
(74) *Attorney, Agent, or Firm* — Christensen, Fonder, Dardi & Herbert PLLC

(57) ABSTRACT

A mounting system for mounting a photovoltaic module onto at least one mounting rail. The mounting system comprises a frame for the photovoltaic module with at least one opening or protrusion at a lateral side or a bottom side of the frame, the bottom side being opposite to light incidence side of the photovoltaic module. The mounting system further comprises a plurality of mounting elements, each comprising a first portion and a second portion for securing the frame to the at least one mounting rail, the first portion defining a hook-like engagement portion to hook into the opening or the protrusion or the bottom side of the frame to provide an interlocking connection, the second portion enabling a secure fixation to the at least one mounting rail.

7 Claims, 13 Drawing Sheets

(51) Int. Cl.
 *F24S 25/632* (2018.01)
 *F24S 25/60* (2018.01)
(58) Field of Classification Search
 CPC ..... F24S 25/632–636; F24S 2025/6002; F24S 2025/6005; F24S 2025/6006; F24S 2025/6012; H02S 30/10
 See application file for complete search history.

(56) References Cited

U.S. PATENT DOCUMENTS

| | | | | |
|---|---|---|---|---|
| 2005/0115176 | A1* | 6/2005 | Russell | E04D 3/3608 52/220.1 |
| 2008/0264470 | A1* | 10/2008 | Masuda | F24S 25/15 136/251 |
| 2013/0145606 | A1 | 6/2013 | Urban et al. | |

FOREIGN PATENT DOCUMENTS

| | | |
|---|---|---|
| DE | 20 2012 008 622 U1 | 1/2013 |
| EP | 2 944 739 A1 | 11/2015 |
| JP | 2010-027979 A | 2/2010 |
| JP | 2010027979 A * | 2/2010 ............ F24S 25/632 |
| WO | WO 2013/074310 A1 | 5/2013 |
| WO | WO 2016/157692 A1 | 10/2016 |

* cited by examiner

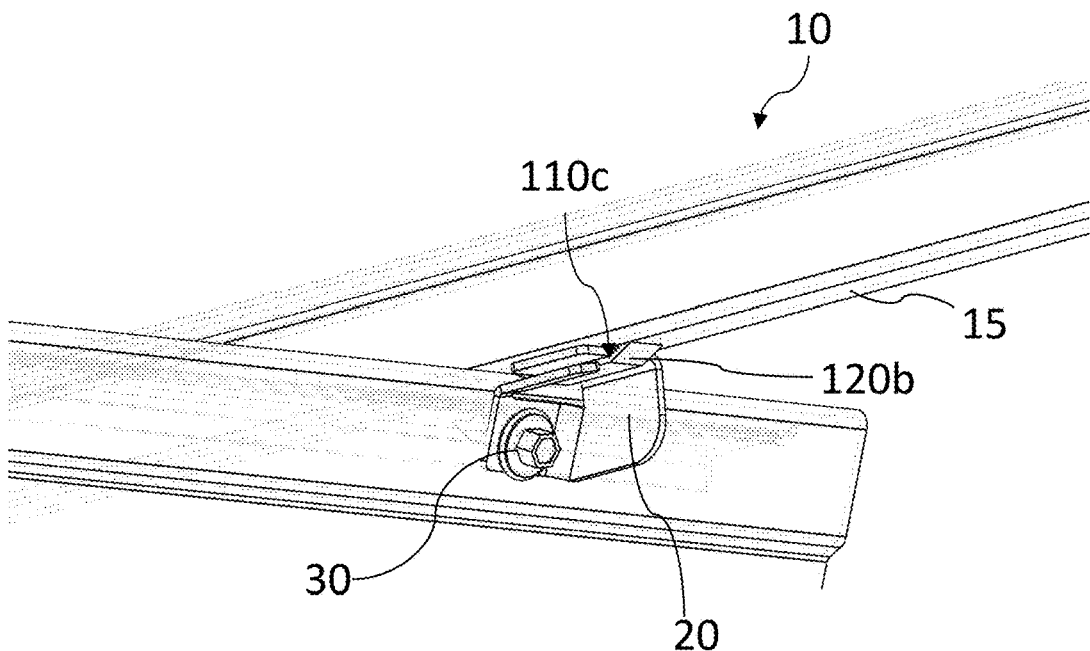
Fig. 5A
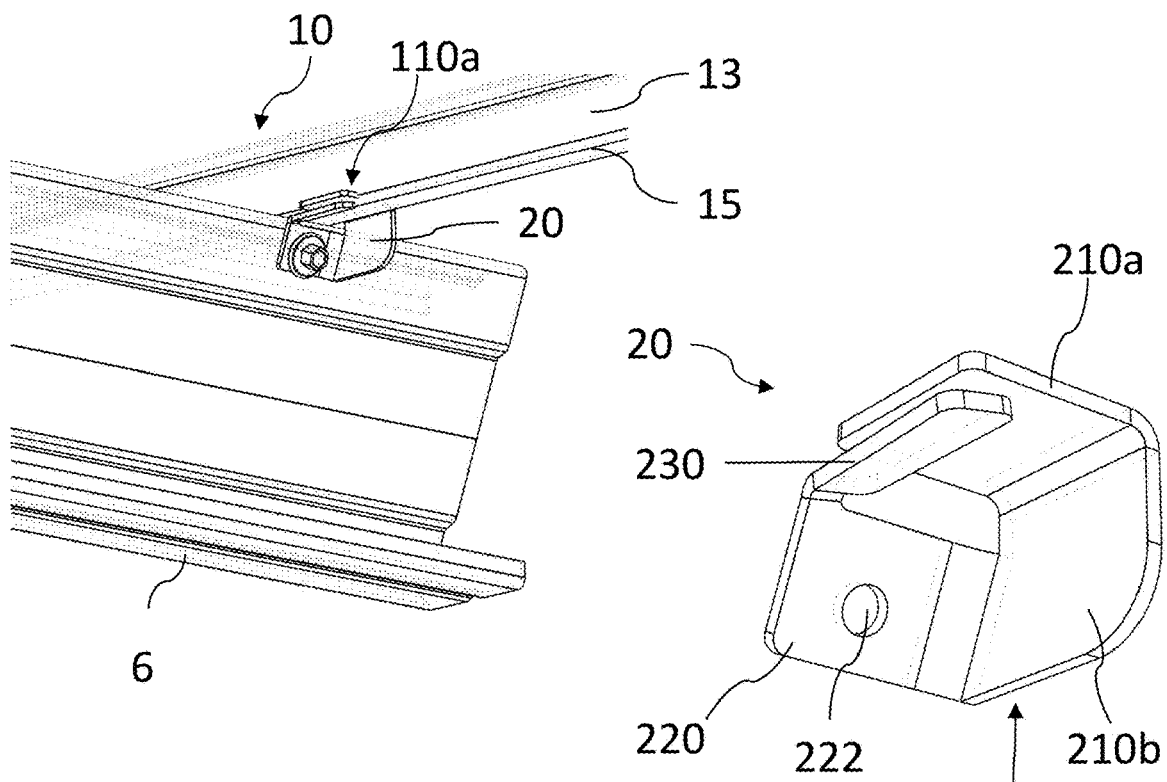
Fig. 5B
Fig. 5C

MOUNTING SYSTEM AND A METHOD FOR MOUNTING PHOTOVOLTAIC MODULES

PRIORITY CLAIM

The present application claims priority to European Patent Application No. 17 155 195.5, filed on Feb. 8, 2017, which said application is incorporated by reference in its entirety herein.

FIELD OF THE INVENTION

The present invention relates to a mounting system and a method for mounting photovoltaic modules onto at least one mounting rail and, in particular, to a steel frame mounting concept with a click key system for mounting photovoltaic modules on rails.

BACKGROUND OF THE INVENTION

Persistent and secure connections between photovoltaic modules and a support structure that are easily to handle involve several problems which are currently not yet satisfactorily solved.

The support structure includes typically a table-like construction with a number of rails, whereon the photovoltaic modules are to be secured. In the process of fixing the photovoltaic modules there is often a need of shifting the photovoltaic modules in all directions before a permanent connection is established. In conventional systems the photovoltaic modules are manually hold before the permanent connection is made. Therefore, the installation of photovoltaic modules involves additional persons to place and hold the photovoltaic modules at desired positions prior to the fixation.

Another problem of conventional installations relates to the fact that the permanent connection is made from a front side (light incidence side) of the modules. Since often numerous modules are to be installed in multiple rows, it becomes cumbersome to replace one of the installed modules, e.g. in an upper row, or to perform a post-processing.

Yet another problem relates to the clamps used in conventional mounting systems. These clamps typically fixate two neighboring modules at the same time. As a consequence, both neighboring modules have to be detached, when a single module shall be replaced. This bears the risk that those modules which do not have to be replaced, become unstable. The same applies to so-called slide-in mounting concepts which do not need clamps, but which require a clearance between an insertion groove (or slot) and the module frame. This may result in a flutter, particularly at windy installation sites.

The clamp systems of conventional mountings hold the frame of the solar module from the front side. Since the clamp connection has to withhold a certain amount of load, the body of the clamp has to be of a certain thickness in order to withhold the forces applied to the clamp connection and to accommodate the screw. As a result, the conventional system needs to have a certain minimum module-to-module clearance in order to enable a reliable clamp connection. This clearance is typically in the range of 20 to 30 mm.

In addition, it is not always possible to place the clamps directly on the mounting rails—at least as long as they are not equipped with a groove to receive a corresponding screw counterpart (for example a nut). However, these kinds of rails are typically manufactured as extruded aluminum profile and are expensive.

Yet another problem of conventional systems relates to the requirement that the first modules in a row have to be aligned with a high precision in order to avoid that a small deviation results finally in a significant angle deviation, because such deviations grow with the number of modules installed in series along the rails.

DE 20 2012 008 622 U1 discloses a conventional suspension mounting system, wherein suspension elements are screwed together with the module frame and are hooked into the underlying rails when installing the photovoltaic modules. However, the connection uses different materials and is prone to undesired contact corrosion and the suspension elements again need a clearance subject to the above-mentioned flutter.

Therefore, there is a demand for alternative mounting systems which overcome at least some of the above-mentioned problems.

SUMMARY OF THE INVENTION

At least some of the problems of the conventional mounting systems are overcome by a mounting system of independent claims. The dependent claims refer to further advantageous realizations of the subject matter of the independent claims.

The present invention relates to a mounting system for mounting a photovoltaic module onto at least one mounting rail. The system comprises a frame for the photovoltaic module and a plurality of mounting elements. The frame comprises at least one opening or protrusion at a lateral side or a bottom side of the frame, wherein the bottom side is opposite to light incidence side of the photovoltaic module. Each mounting element of the plurality of mounting elements comprises a first portion and a second portion for securing the frame to the at least one mounting rail. The first portion defines a hook-like engagement portion to hook into the opening or the protrusion of the frame to provide an interlocking connection. The second portion enables a secure fixation to the at least one mounting rail.

The terms "protrusion" and "opening" shall be construed broadly and shall include all means that are suitable to be hooked-up with a hook-like engagement portion to obtain an interlocking connection. The protrusion may, in particular, relate to a bottom plate-like portion that can be engaged or grabbed by another plate-like portion of the mounting element. The opening may have any shape such as a rectangular, a slit, a circle, a (punch) cut or as any kind of through hole so that an engagement portion can be inserted and secured in an interlocking way. The term "rail" shall cover any kind of support structure that is able to hold the frame. It may have a flat, a curved or wavy upper surface to securely fix thereon one or more frames (e.g. adjacent to one another).

Optionally, the frame comprises a steel material (e.g. formed at least partially as a steel sheet). Furthermore, the second portion may enable a screw connection between the mounting elements and the at least one mounting rail, which may likewise comprise a steel material. There are two particular variants for attaching the mounting elements to the frame: a first variant is given by the protrusion on the bottom side of the frame. For example, the protrusion can extend parallel to the light incidence side or can protrude to the rear side of the module (opposite to the light incidence side). The second variant uses an opening slit at a lateral (vertical) frame side, wherein the opening is vertical to the light incidence side, or a rectangular opening in the (plate-like) bottom side of the frame. Both variants may or may not be combined for a single module frame or at a side thereof.

Therefore, the protrusion may be a portion on the bottom side extending parallel to the light incidence side and comprising the at least one opening. The first portion of at least one of the mounting elements may comprise a plate shape with a cut-out part. The cut-out part may be configured to receive a portion on the bottom side of the frame upon inserting the mounting element into the opening of the frame and rotating the mounting element relative to the frame.

Optionally, the first portion of at least one of the mounting elements is angled relative to the second portion and is formed plate-like to hook up the opening formed as a slit at a lateral frame side or the protrusion formed as a lower plate-like portion extending parallel to the light incidence side of the frame.

Optionally, the first portion of at least one of the mounting elements may be angled relative to the second portion and folded to provide a gap between the folded parts of the first portion such that a protrusion formed as a lower plate-like portion of the frame can be inserted into the gap between the folded part. If the frame comprises an opening at the lateral frame side, one of the folded parts may optionally configured to be inserted into the opening. Consequently, there will be a clearance or another gap between the frame and the mounting rail defined by the folded part that is not inserted in the opening.

Optionally, the frame comprises a portion on the bottom side extending parallel to the light incidence side and comprising the at least one opening formed as a loop. Accordingly, the first portion of at least one of the mounting elements comprises a plate-like part which is configured to be inserted into the loop. The first part of the at least one mounting element may further comprise a locking mechanism or a latch that is configured to prevent an inserted first portion from being pulled out of the loop.

Optionally, at least one of the mounting elements comprises two opposite wing portions on opposite sides of the second portion to mount two adjacent photovoltaic modules on one mounting rail. Each wing portion may be configured to be inserted into the opening of the frame and comprises a recess portion to engage with an edge of the opening of the frame to enable a secure fixing of the two adjacent frames in a predetermined distance from each other defined by a distance of both recess portions of the opposite wing portions. According to another embodiment only one wing portion is formed to fixate a single frame.

Optionally, at least one of the mounting elements is formed plate-like with two pairs of bended opposite edge portions to mount two adjacent photovoltaic modules on one mounting rail. Accordingly, the second portion is located between the bended opposite edge portions. One pair of the bended edge portions define first portions to hook into edges of openings in the frames of the adjacent photovoltaic modules and the other pair of bended portions define spacers between the frames. In particular, opposite edge portions may protrude in one direction. It may also be possible to form only a single bended edge portion to fixate a single frame.

Optionally, at least one of the mounting elements is rotatably fixed to the frame (e.g. by its first portion) such that by a rotation of the at least one mounting element the frame can be secured to the at least one mounting rail by its second portion. This rotation can be limited by a stopper. The stopper may be a punched out or a bended part from the lateral (vertical) frame side or may be formed by a separately attached part.

Optionally, the first portion of at least one of the mounting elements comprises a tongue element configured to be inserted into an opening of the frame formed at the bottom side, thereby securing the frame. The opening in the frame may be punch line or an excised portion.

Optionally, at least one of the mounting elements comprises a belt with a closing element. The belt may be configured to wrap around at least one of the mounting rails while passing through the opening of the frame and the closing element is configured to fasten the belt.

Further embodiments relate to a mounting system for mounting a photovoltaic module onto at least one mounting rail, wherein the system comprises a frame for the photovoltaic module with a portion on the bottom side extending parallel to a light incidence side of the photovoltaic module. The bottom side is opposite to light incidence side of the photovoltaic module and comprises a tongue-like element as a cut-out portion configured to be bent toward the mounting rail to securely attach the frame to the mounting rail (e.g. using a screw connection). In an alternative embodiment the tongue-like element can also be realized as a cut-out portion of the vertical, lateral frame side configured to be bent toward the mounting rail to securely attach the frame to the mounting rail (e.g. by a screw connection).

Further embodiments relate to a mounting system for mounting a photovoltaic module onto at least one mounting rail, wherein the system comprises a frame and a plurality of mounting elements. The frame includes a lateral side extending perpendicular to light incidence side of the photovoltaic module. Each mounting element of the plurality of mounting elements comprises a first portion and a second portion for securing the frame to the at least one mounting rail. The first portion may define a plate configured to allow a clinch or a press joining connection with the frame. The second portion may enable a secure fixation to the at least one mounting rail.

The present invention relates also to a photovoltaic system with one or more photovoltaic modules, at least one mounting rails, and one of the above described mounting system that are configured to mount the one or more photovoltaic modules onto the at least one mounting rail.

Embodiments are particularly suitable for instalments of solar power plants, where numerous modules are to be installed. The front sides (light incidence side) of modules in such power plants are typically not easily accessible. On the other hand, since the rear sides are typically easily accessible, the installation and de-installation according the present invention can easily be done, because embodiments are particularly suitable to fix the mounting elements from underneath the light incidence surface.

The present invention relates also to a method for mounting a photovoltaic module onto at least one mounting rail. The method comprises the steps of:
  providing a frame for the photovoltaic module with at least one opening or protrusion at a lateral side or a bottom side of the frame, the bottom side being opposite to a light incidence side of the photovoltaic module;
  securing the frame to the at least one mounting rail by using a plurality of mounting elements, each comprising a first portion and a second portion by:
  hooking the first portion into the opening or the protrusion of the module frame to provide an interlocking connection; and
  fixing the second portion to the at least one mounting rail.

Advantageous aspects of the various embodiments can be summarized as follows:

The present invention relates to a simple and fast way of installing many photovoltaic modules on an underlying support construction with a number of rails whereon the photovoltaic modules are installed. All elements, i.e. the frames, the mounting elements, the screws, the rails, may comprise a steel material so that contact corrosions are avoided. In addition, since steel is a very stable material it allows also the use of thin walls or sheets of all components subject to a force transmission.

Embodiments use comparably small mounting elements, which may also be denoted by keys. These mounting elements may hook up in the openings or protrusions of the frame before placing the modules on the mounting rail(s). The inserted mounting elements can act as a stop when placing the modules onto the mounting rail(s) so that no additional persons are needed to hold the placed module in place.

Finally, the mounting elements can be tightly fixed to the mounting rails such that no flattering can occur—even if the solar modules are installed at a windy location. For example, a screw connection can be used that applies a pre-tension on the mounting elements.

BRIEF DESCRIPTION OF THE DRAWINGS

Various embodiments of the present invention will be described in the following by way of examples only, and with respect to the accompanying drawings, in which:

FIGS. 5A-5C depict another embodiment of the mounting system, wherein the frame comprises an opening formed as a loop or as a slit.

DETAILED DESCRIPTION

Various examples will now be described more fully with reference to the accompanying drawings in which some examples are illustrated.

Accordingly, while examples are capable of various modifications and alternative forms, the illustrative examples in the figures will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements and/or components, but do not preclude the presence or addition of one or more other features, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1A:
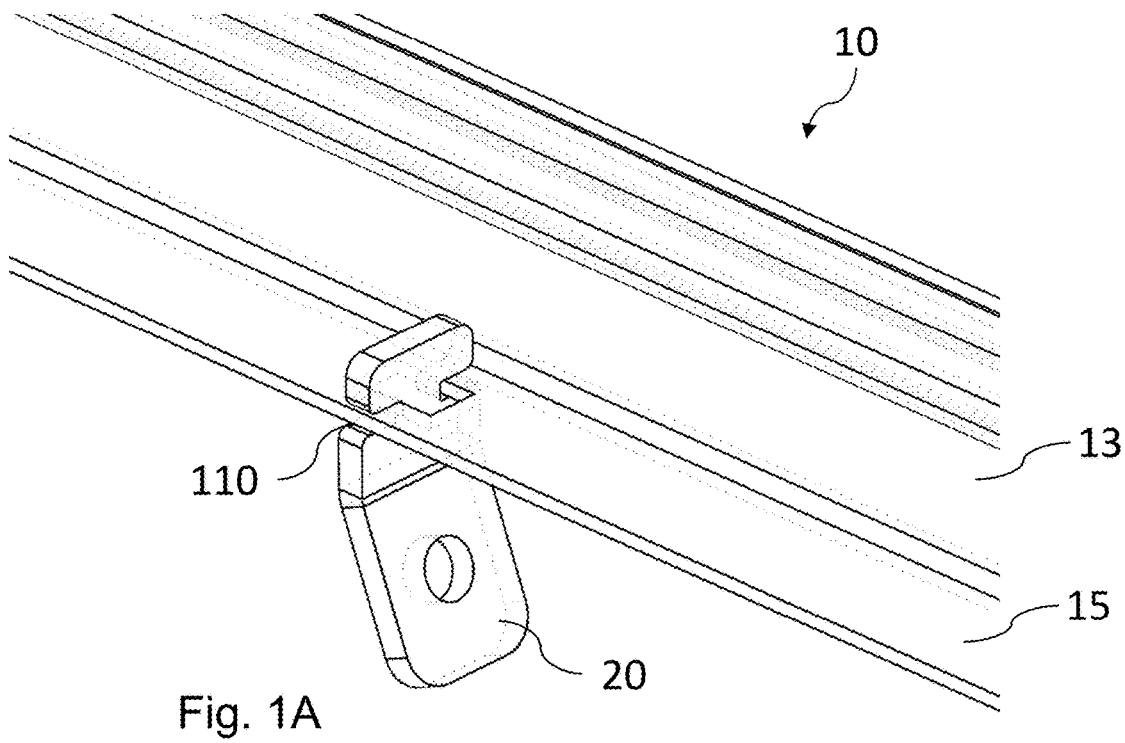
FIGS. 1A,1B depict an embodiment of the mounting system for mounting a photovoltaic module.
Figure 1B:
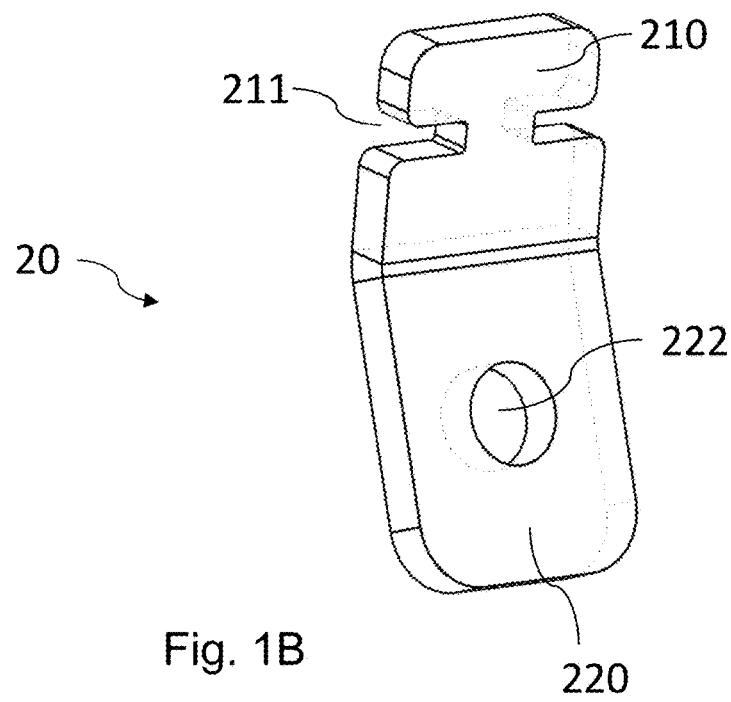

FIGS. 1A, 1B depict an embodiment of the mounting system for mounting a photovoltaic module (not shown) onto at least one mounting rail (not shown). The mounting system comprises a frame 10 for the photovoltaic module depicted in FIG. 1A and at least one mounting element 20 depicted in FIG. 1B. The mounting element 20 comprises a first portion 210 and a second portion 220, wherein the first portion 210 comprises a cutout part 211 and the second portion 220 comprises a through-hole 222. The frame 10 comprises a lateral frame side 13 and a bottom side 15 with at least one opening 110. The bottom side 15 is opposite to the light incidence side of the photovoltaic module and is, for example, formed as a protrusion extending perpendicularly from the lateral frame side 13.

The first portion 210 of the mounting element 20 is configured to secure the frame 10 to the at least one mounting rail and defines a hook-like engagement portion (the cut-out part 211) to hook into the opening 110 of the frame 10 to provide an interlocking connection. It may also be possible, that the cut-out part 211 receives the bottom side 15 that defines a protrusion capable to hold the frame 10. The second portion 220 with the through-hole 222 enables a secure fixation at the at least one mounting rail. The secure fixation may, for example, be done using a screw connection to the mounting rail.

In the embodiment of FIGS. 1A, 1B the first part 210 is angled with respect to the second part 220 to enable an angled fixation of the photovoltaic module(s) on the at least one mounting rail.

When installing the photovoltaic modules on the rails at an installation site (e.g. a solar power plant), the mounting elements 20 are inserted in the openings 110 and subsequently rotated resulting in an interlocking connection between the mounting elements 20 and the frame 10 without the need of further mounting parts. The photovoltaic modules with inserted mounting element 20 can be handled as a unit and lifted from transportation means to place them on the mounting rails. The compound structure of photovoltaic module and mounting elements 20 will self-align on the mounting rails due to a mechanical stop provided by the inserted mounting elements 20. However, the photovoltaic modules are still movable horizontally along the rails and thus can be adjusted with respect to each other. To provide a permanent stable connection of the compound structure (photovoltaic module and mounting elements 20) with the rails, the mounting elements 20 may be secured to the rails using an exemplary screw connection or by using other permanent mounting means such as a clinch or a press joining, rivets, a welding or other. The connection may be established in a pre-strained way to compensate for any possible clearance or play between the mounting elements and the frame.

Figure 2:
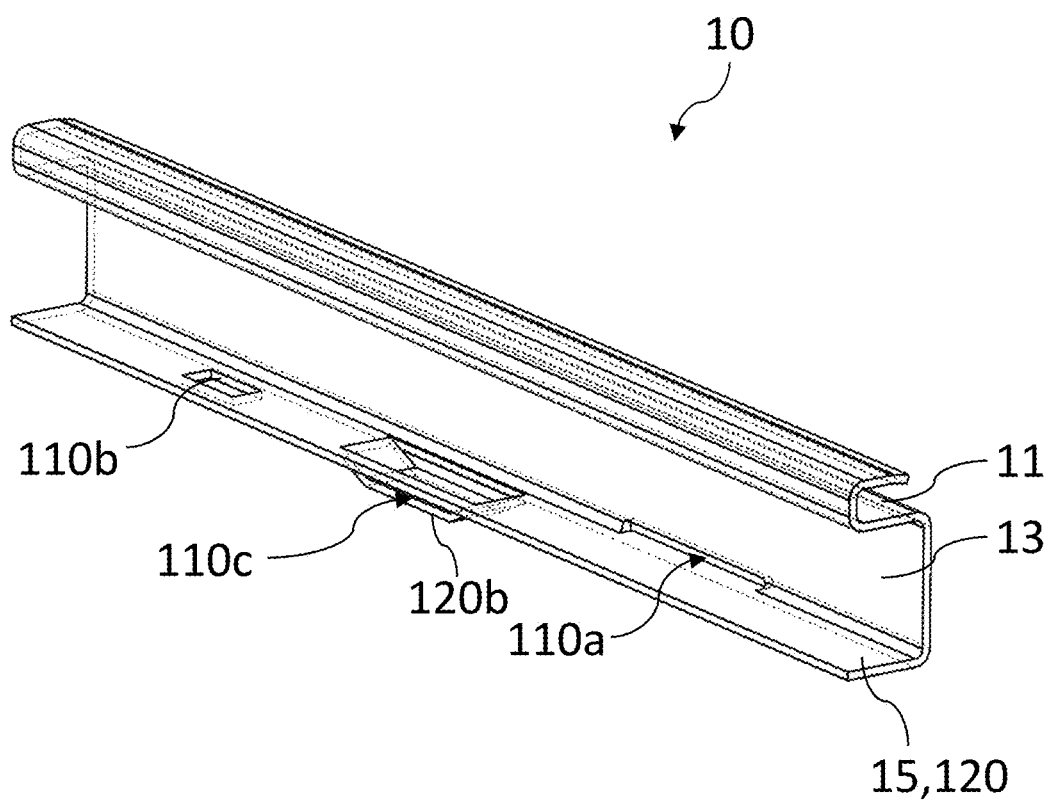
FIG. 2 illustrates the various possibilities of forming the opening or protrusions within the frame.

FIG. 2 illustrates the various possibilities of forming the openings 110 or protrusion 120 within the frame 10. For example, the opening 110 may be formed at the lateral side 13 of the frame 10, e.g. as a slit opening 110a. The opening 110 may also be formed within the bottom side 15 which extends parallel to the light incidence side of the photovoltaic module. An example for such an opening 110 is the loop-like opening 110c or the through-hole 110b.

As mentioned above the bottom side 15 may likewise represent the projection 120 to allow the mounting elements 20 to hook into this portion. It is also possible that the projection 120 is formed as a loop 120b, for example in the plate-shaped bottom side 15.

It will be appreciated that the depicted openings 110a, 110b, 110c and the protrusions 120a or 120b will generally not all be realized within a given frame 10. However, the various types of openings 110 or 120 may be implemented in various frames or at different sides of a frame according to embodiments of the present invention.

The depicted frame 10 shows further a support portion 11 for the photovoltaic module. The photovoltaic module itself is not shown but can be inserted into the support portion 11 to hold the photovoltaic module, especially a solar module laminate. A solar module laminate comprises a solar cell string usually surrounded by an EVA (ethylene-vinyl acetate) foil and a glass on the light incidence (front) side and an EVA foil and a backsheet on the back side opposite to the light incidence side. The laminate and the frame together are commonly called a solar module.

The frame 10 may further comprise a rectangular shape with a long and a short side. The short side of the frame 10 may hold the laminate by bent hold support portions (see FIG. 3A), whereas the long sides of the frame 10 can be shaped with an S-profile to hold the laminate within a support portion 11.

Figure 3A:
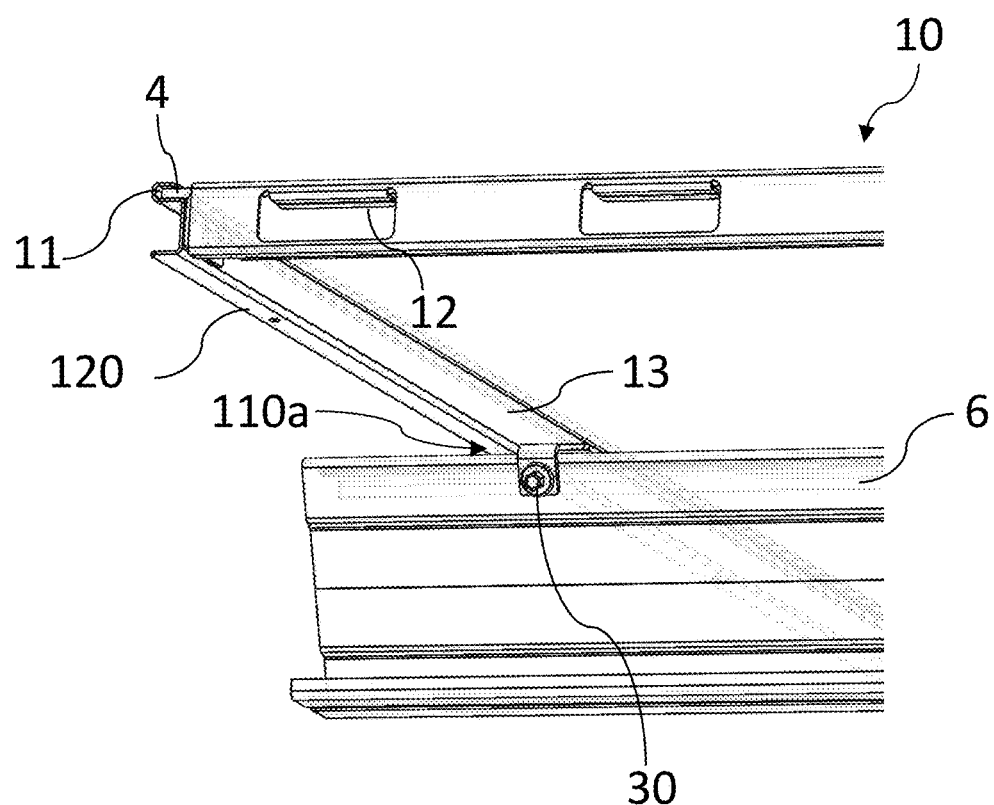
FIGS. 3A,3B depict another embodiment of the mounting system with the mounting element.
Figure 3B:
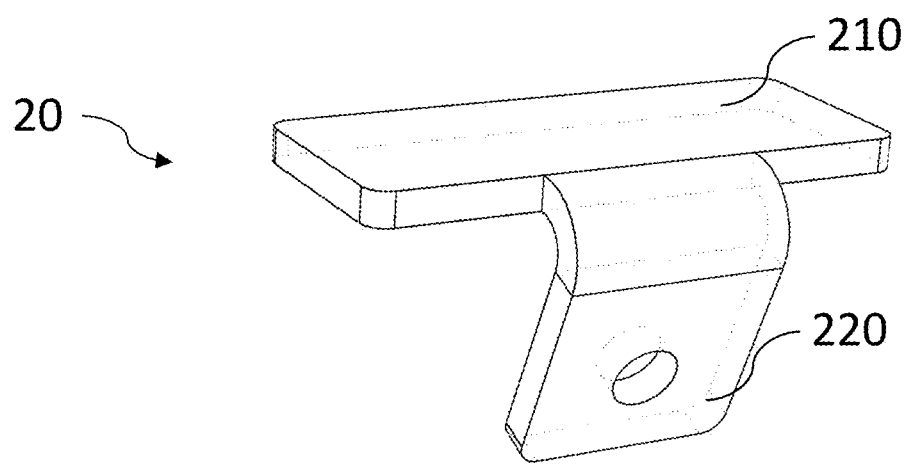

FIGS. 3A, 3B depict another embodiment of the mounting system using a different type of mounting elements 20 (see FIG. 3B). The corresponding frame 10 is depicted in FIG. 3A. The frame 10 again comprises the support portion 11, where a laminate is inserted as indicated in FIG. 3A. The frame 10 further comprises bent hold portions 12 which secure the laminate along one side of the frame 10. In addition, the frame 10 comprises a plate-like bottom side 15 with the slit-like opening 110a at the adjacent lateral frame side 13 (cp. FIG. 2). In addition, FIG. 3A shows an exemplary mounting rail 6 on which the frame 10 is mounted using the mounting element 20. The mounting element 20 of FIG. 3B comprises likewise a first portion 210 and a second portion 220 which are bent relative to each other so that the first portion 210, when installed, extends parallel to the bottom side 15 of the frame 10 and can be inserted into the slit-like opening 110a in the lateral frame side 13.

An exemplary screw connection 30 finally (tightly) secures the frame 10 to the mounting rail 6.

Figure 4A:
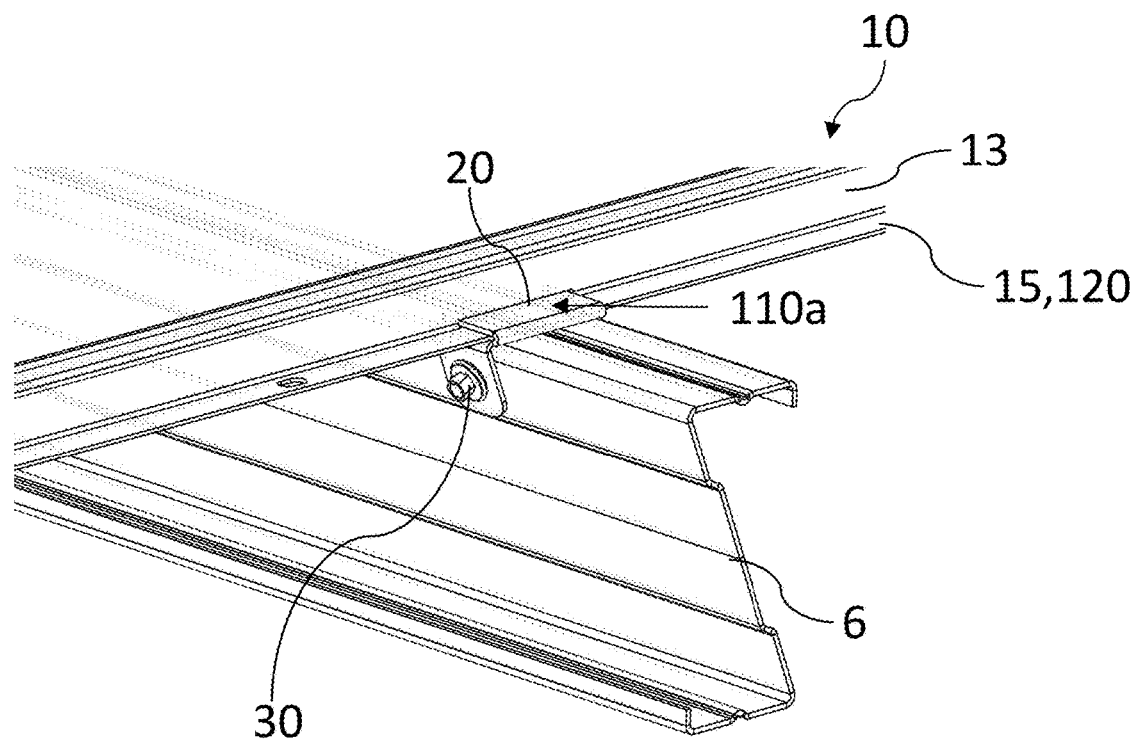
FIGS. 4A,4B depict another embodiment for the mounting system, wherein the frame again comprises a lower plate-like portion as protrusion.
Figure 4B:
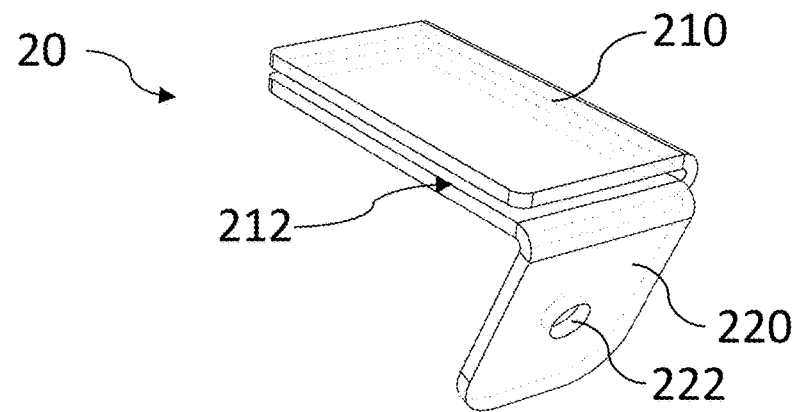

FIGS. 4A, 4B depict yet another embodiment for the mounting system, wherein the frame 10 again comprises a bottom side 15 representing a protrusion 120. The frame 10 is mounted on the mounting rail 6 using the mounting element 20 shown in FIG. 4B. The mounting element 20 in this embodiment comprises a first portion 210 formed as a folded element to provide a gap 212 between the folded parts of the first portion 210. The gap 212 is adapted to receive the plate-like bottom side 15 of the frame 10. The mounting element 20 again comprises the second portion 220 with a through hole 222.

The frame 10 further comprises an optional slit-like opening 110a in the lateral frame side 13 to insert therein the upper of the folded parts 210 (the one which is not directly connected to the second portion 220). The through-hole 222 within the second portion 220 of the mounting element 20 is adapted to enable a screw connection 30 of second portion 220 to the mounting rail 6.

The result is shown in FIG. 4A, wherein the mounting element 20 fixes securely the frame 10 to the rail 6.

FIGS. 5A-5C depict another embodiment of the mounting system, wherein the frame 10 comprises at least one loop-like opening 110c at the lower plate-like bottom side 15 formed as a protrusion 120b projecting from the bottom side 15 (see FIG. 5A) or comprises a slit-like opening 110a at the lateral frame side 13 (see FIG. 5B).

FIG. 5C shows the respective mounting element 20 used in this embodiment. The first portion 210 of the mounting element 20 comprises a first part 210a configured to be inserted in the loop-like opening 110c of the frame 10 (see FIG. 5A) or the slit 110a (see FIG. 5B). The first portion 210 further comprises a second part 210b being angled perpendicularly to the first part 210a. The second portion 220 is likewise angled perpendicularly relative the second part 210b and comprises the through hole 222 for the screw connection 30 to attach the mounting element 20 to the mounting rail 6. The mounting element 20 is thus formed as a corner portion of a solid configured to attach the second portion 220 to the rail 6 and the first part 210a to the loop opening 110c or the slit 110a of the frame 10.

Optionally, the mounting element 20 comprises at least one locking mechanism 230 extending perpendicularly from the second portion 220. The locking mechanism is configured to prevent an inserted first part 210a in the loop opening 110c from being pulled out of the loop 110c. This locking mechanism may, for example, be a latch which provides a stop surface to latch the connection after the first part 210a has been inserted into the loop-like or slit-like opening 110c, 110a. Therefore, the mounting element 20 represents a snap-in mechanism that prevents a pullout of the mounting element 20.

Figure 6A:
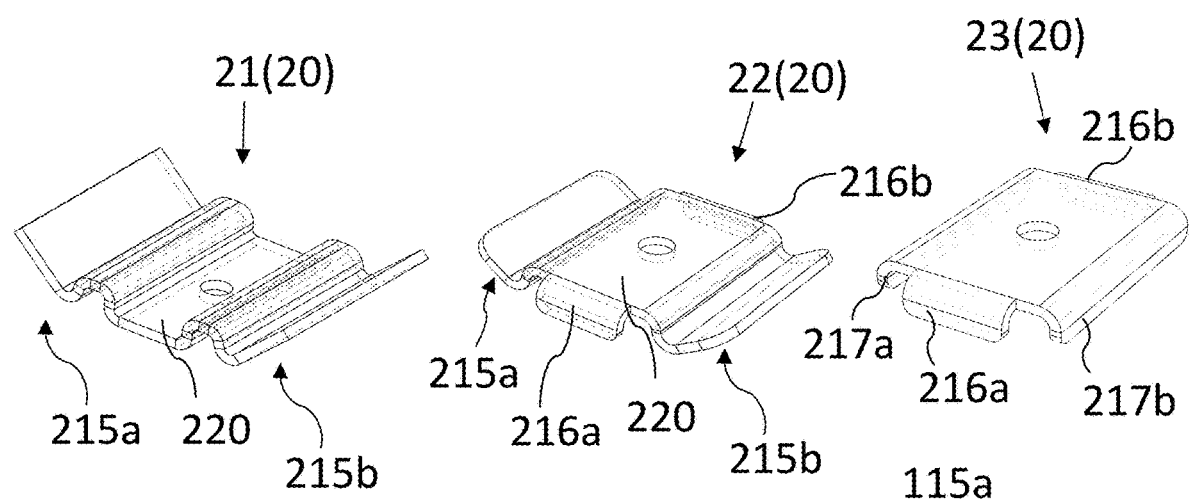
FIGS. 6A-6C depict another embodiment that enables to mount two adjacent photovoltaic modules onto a single rail.
Figure 6B:
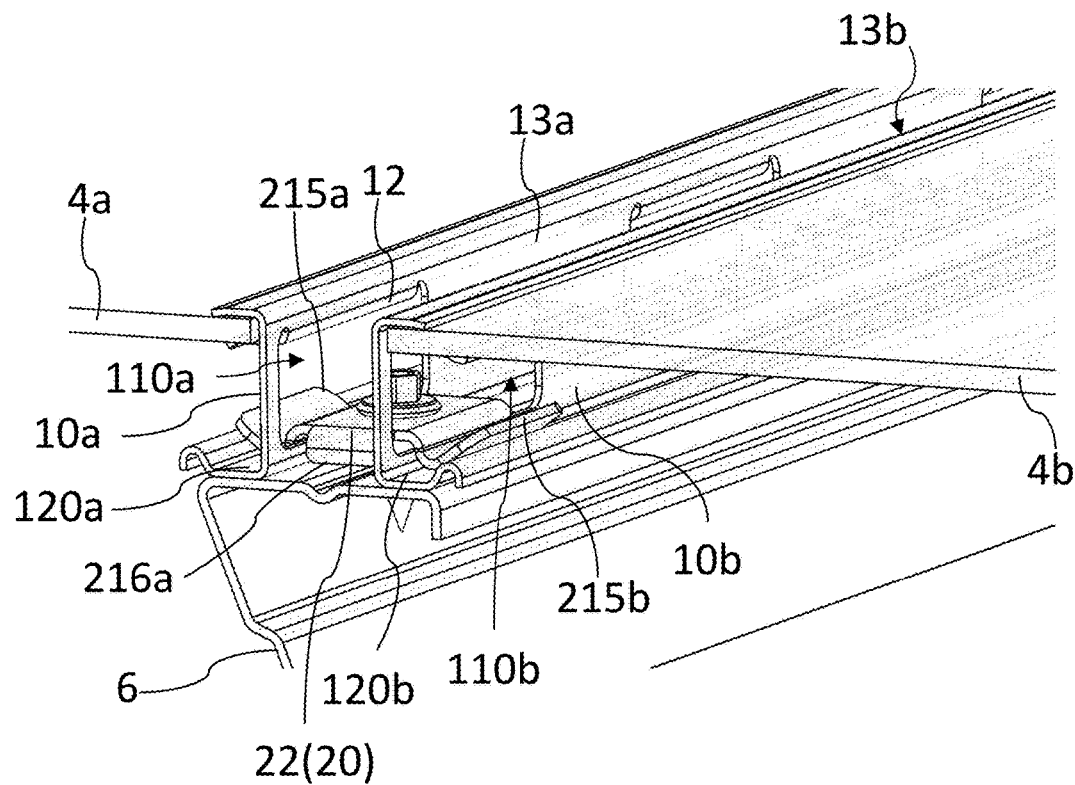
Figure 6C:
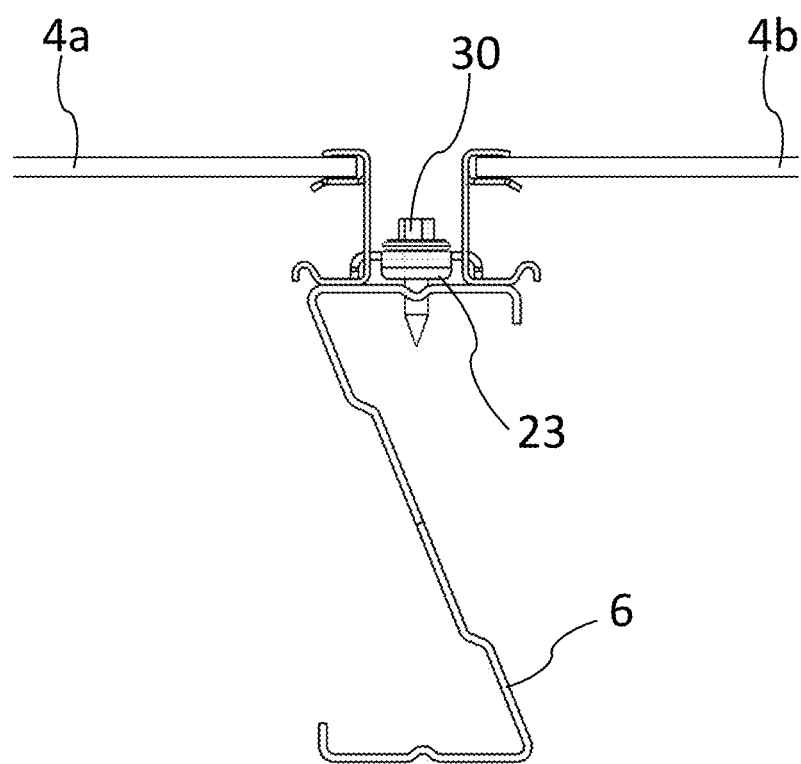

FIGS. 6A-6C depict another embodiment of the mounting system, which enables to secure two adjacent photovoltaic modules 4a and 4b onto one mounting rail 6. The mounting rail 6 comprises an upper parallel plate-like formed portion (e.g. part of Z-shaped profile), whereon the two adjacent photovoltaic modules 4a, 4b with their frames 10a and 10b are mounted using a common mounting element 20.

FIG. 6A shows a first, a second and a third mounting element 21, 22, 23 that can be used as mounting elements 20.

The second portion 220 of these mounting elements again comprises a through-hole 222 configured to be used for a screw connection 30 to safely mount the photovoltaic modules 4a, 4b on the one mounting rail 6.

The first mounting element 21 comprises two opposite wing portions 215a, 215b on opposite sides of the second portion 220 to mount the adjacent photovoltaic modules 4a, 4b onto one mounting rail 6. The second mounting element 22 comprises in addition to the second portion 220 sandwiched by two opposite wing portions 215a, 215b further bent edge portions 216a, 216b arranged on opposite sides of the second portion 220 and between the two wing-like portions 215a, 215b. The bent opposite edge portions 216a, 216b are configured to provide spacers between the adjacent photovoltaic modules 4a, 4b to define a predetermined clearance between the two photovoltaic modules 4a, 4b. The third mounting element 23 comprises no wing-like portions 215a, 215b, but instead further bent opposite edge portions 217a, 217b. Again, the bent edge portions 217a, 217b are configured to engage edge portions of the openings 110a, 110b to securely fix the frames 10a, 10b of the photovoltaic modules 4a, 4b to the one mounting rail 6.

The depicted mounting elements 21, 22, 23 comprise a rectangular second portion 220, wherein on the edges of the rectangular second portion 220 either wing portions 215 or bent edge portions 216, 217 are formed.

FIG. 6B depicts an embodiment, wherein the second mounting element 22 was used to mount the two photovoltaic modules 4a and 4b. The opposite wing-like portions 215a, 215b extend through openings 110a and 110b at the lateral frame sides 13a, 13b. The openings 110a, 110b comprise lower edge portions and the wing-like portions 215a, 215b comprise corresponding recesses to receive the edge portions of the openings 110a, 110b thus enabling a secure fixation of both frames 10a, 10b. The bent opposite edge portions 216a, 216b are arranged between the two frames 10a, 10b and act as spacers to define the mentioned clearance between the photovoltaic modules.

FIG. 6C depicts a cross-sectional view of an embodiment for mounting two adjacent photovoltaic modules 4a, 4b onto one rail 6 using the third type of mounting elements 23. Again, a screw connection 30 is used to securely fix the photovoltaic modules 4a, 4b onto one the mounting rail 6 without any play between the frame(s) 10a, 10b and the mounting rail(s) 6.

Figure 7A:
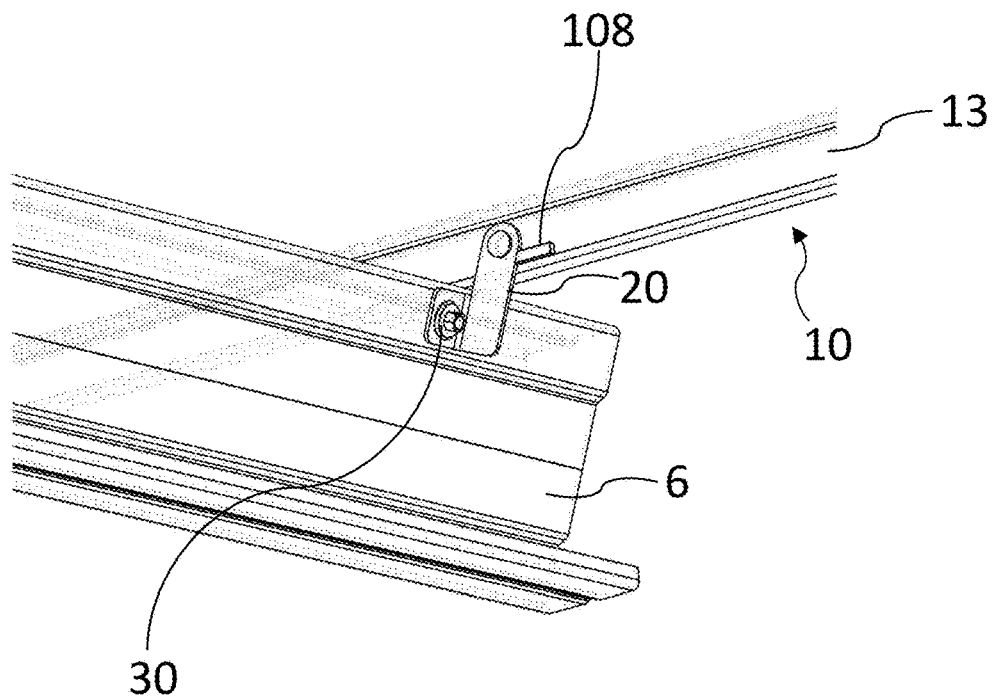
FIGS. 7A, 7B depict yet another embodiment of the mounting system, wherein the mounting elements are rotatably fixed to the frame.
Figure 7B:
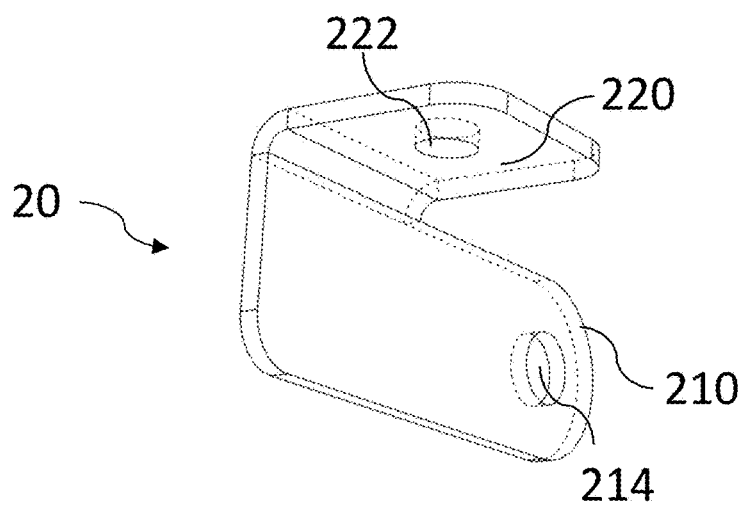

FIGS. 7A, 7B depict another embodiment of the mounting system, wherein the mounting elements 20 are rotatably fixed to the frame 10 such that by a rotation of the mounting elements 20 the frame 10 can be secured to the mounting rail 6. To achieve this, the mounting element 20 as shown in FIG. 7B comprises in its first portion 210 a through-hole 214. The through-hole 214 is configured to provide a rotatable connection to the frame 10, for example by inserting a respective bolt connection (see FIG. 7A). In addition, the mounting element 20 comprises again a second portion 220 with a through-hole 222 for enabling a screw connection 30 to the rail 6, wherein the second portion 220 is bent rectangularly when compared to the first portion 210.

This embodiment provides the advantage that the mounting element 20 can be pre-installed on the frame 10, for example at the lateral frame side 13 so that in the field, where the photovoltaic module shall be installed on the rail 6, the rotatable mounting element 20 can be rotated out of the frame 10. In addition, the frame 10 may comprise a stopper 108 which is configured to provide a stopping surface for the rotatable mounting element 20 so that the rotatable mounting element 20 can only be rotated out of the frame 10 up to a particular angle with which the photovoltaic module shall be installed on the underlying rail structure. The stopper 108 may, for example, be a punched out part from the lateral frame side 13. However, it is also possible to form a separate element on the frame 10 to provide such a stopper function. When the rotatable mounting element 20 is rotated out of the frame 10, the photovoltaic module can be placed on the rails 6 and does not need to be held by hand in order to fixate the frame 10 by the screw connection 30 to the rail 6.

Figure 8A:
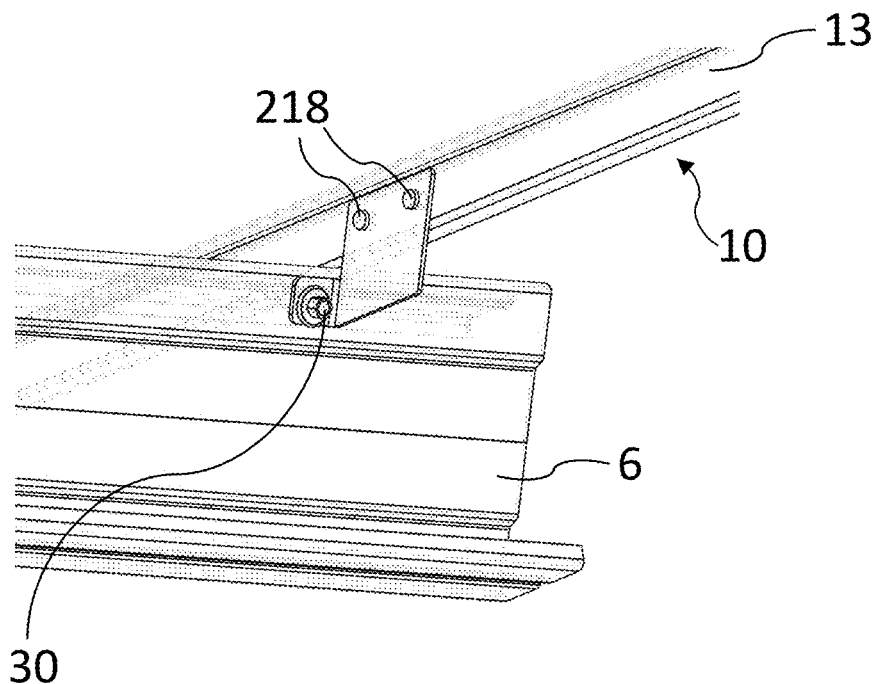
FIGS. 8A, 8B depict yet another embodiment of the mounting system based on a clinch connection.
Figure 8B:
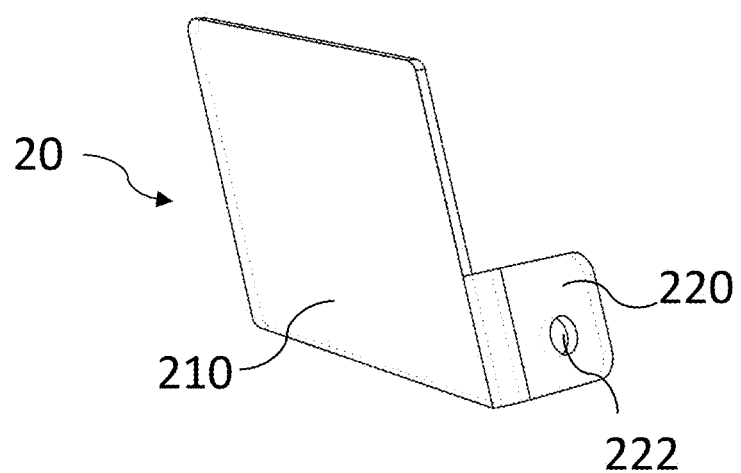

FIGS. 8A, 8B depict another embodiment of the mounting system. In this embodiment the mounting element 20 comprises a first portion 210 formed plate-like, for example without any structure, but within a rectangular angle when compared to the second plate-like formed portion 220. The first portion 210 is configured to enable a clinch connection or a press-joining connection between the first portion 210 and the frame 10. For this, the first portion 210 and/or the lateral frame side 13 may be formed as steel sheets which can be joined by clinching or press-joining. FIG. 8A depicts such clinch/press-joining connection points 218 formed between the first portion 210 and the lateral frame side 13. For example, the clinch connection can be formed at one or more points as shown in FIG. 8A.

As in the other embodiments, the second portion 220 is again secured to the rail 6 using an exemplary screw connection 30 passing through the through-hole 222.

Figure 9:
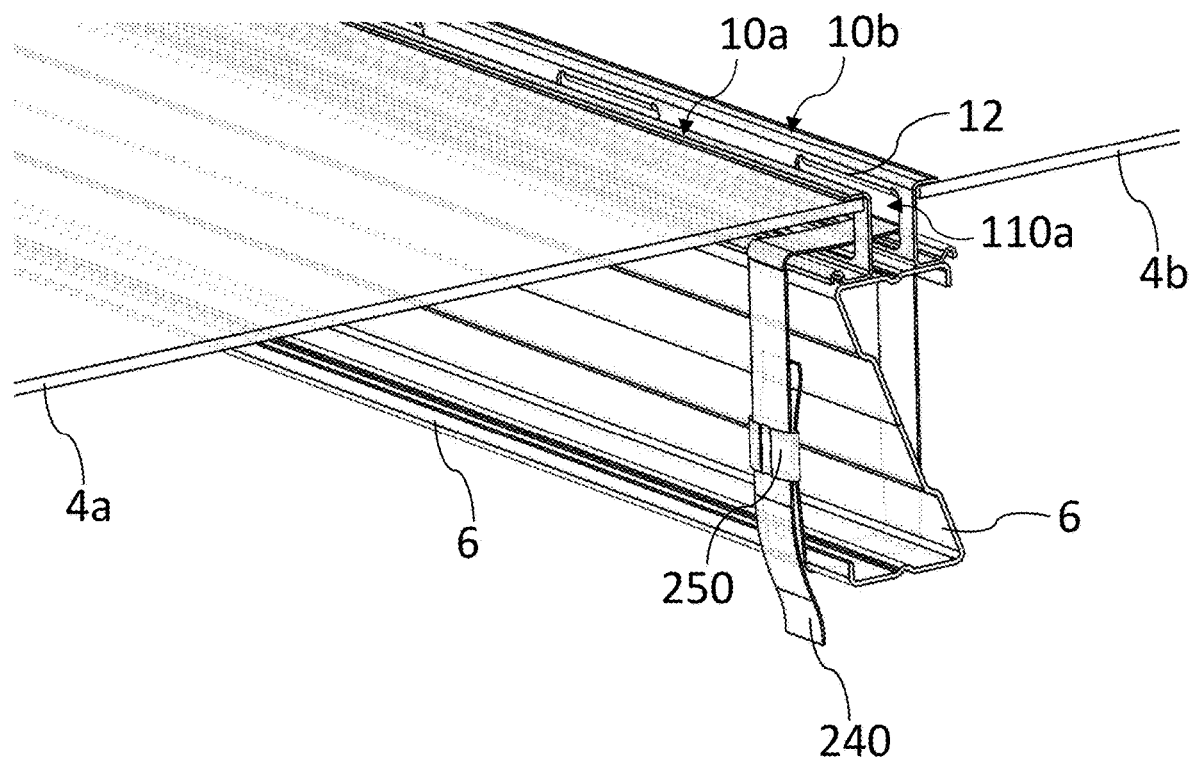
FIG. 9 depicts embodiment for the mounting system, wherein at least one mounting element comprises a belt with a closing element.

FIG. 9 depicts another embodiment for the mounting system, wherein at least one mounting element 20 comprises a belt 240 with a closing element 250. The belt 240 is configured to wrap around at least one rail 6 while passing through the openings 110a, 110b of two neighboring frames 10a, 10b. The closing element 150 is configured to fasten the belt 240, thereby securing two neighboring frames 10a, 10b onto a single rail 6. The rail 6 has again a Z-shaped profile with an upper surface whereon the two neighboring frames 10a, 10b can be placed, and the belt 240 secures both frames onto the one rail 6. Optionally, spacers can be arranged between the two neighboring frames 10a, 10b of the two solar modules 4a, 4b to ensure a minimal space between both frames 10a, 10b. Alternatively, the spacer may also be replaced by some surface structure (for example grooves and/or keys) which prevent a lateral displacement of the neighboring frames 10a, 10b.

Again, the depicted belt connection may also be used to mount a single frame 10 onto one rail 6.

Figure 10A:
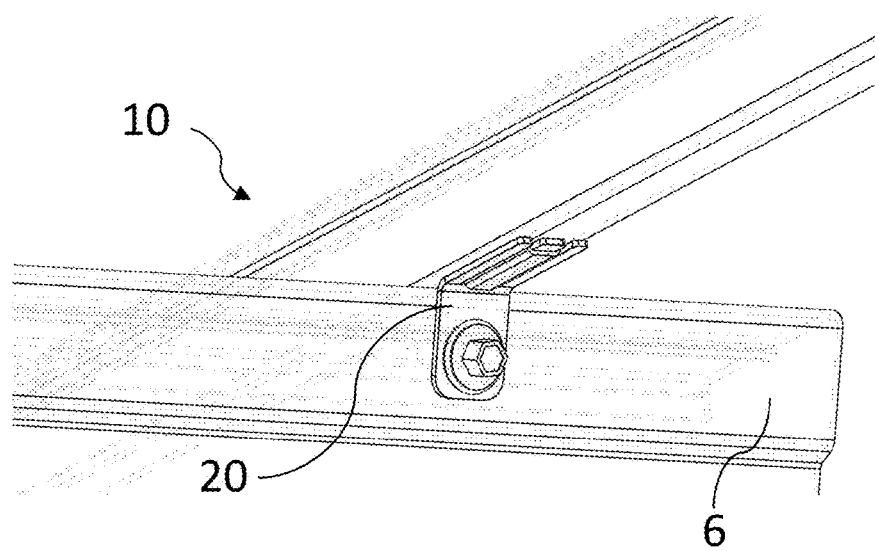
FIGS. 10A-10C depict yet another embodiment with a tongue-like engagement between the frame the rail.
Figure 10B:
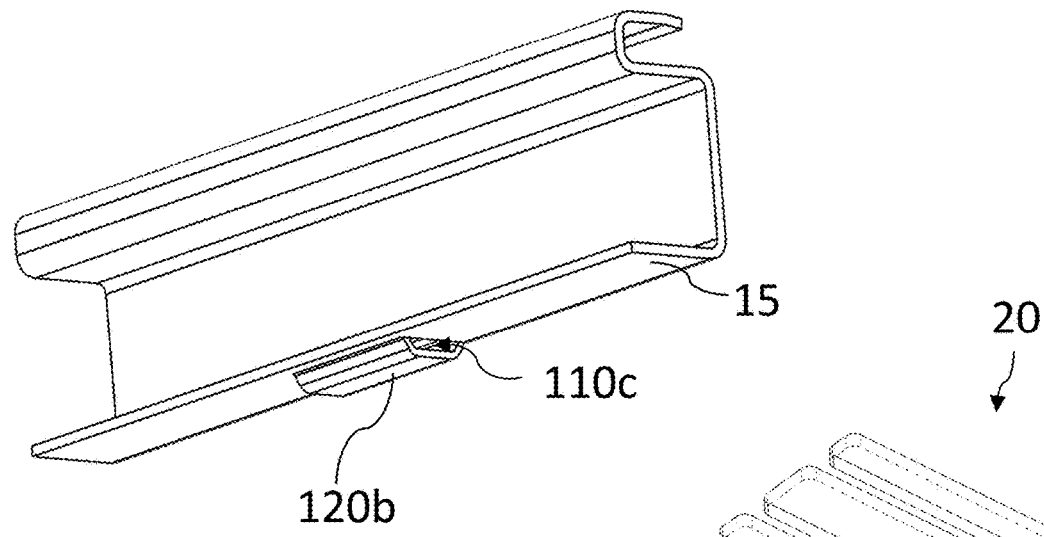
Figure 10C:
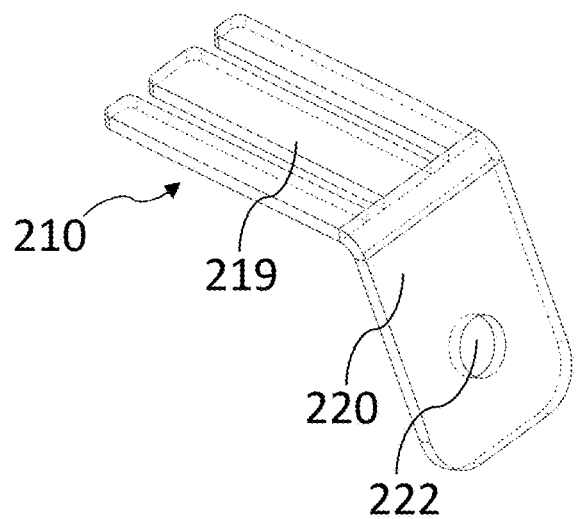

FIGS. 10A-10C depict yet another embodiment for the mounting system, wherein the frame 10 comprises a protrusion 120b formed as a loop with an opening 110c at the bottom part 15 (see FIG. 10B and FIG. 2). FIG. 10C depicts the mounting element 20 which comprises a tongue element 219 which is configured to fit into the opening 110c of the loop (see FIG. 10A). By inserting the tongue element 219 in the opening 110c the frame 10 can be attached to rail 6 using, for example, a screw connection 30 and the through hole 222.

Also for this embodiment the frame can simply be placed on the rail 6 without a person needed to hold the frame 10. The mounting element 20 provides sufficient support for holding the frame 10 (together with the laminate). The frame 10 can still be moved before the permanent fixation with the screw connection is made.

Figure 11:
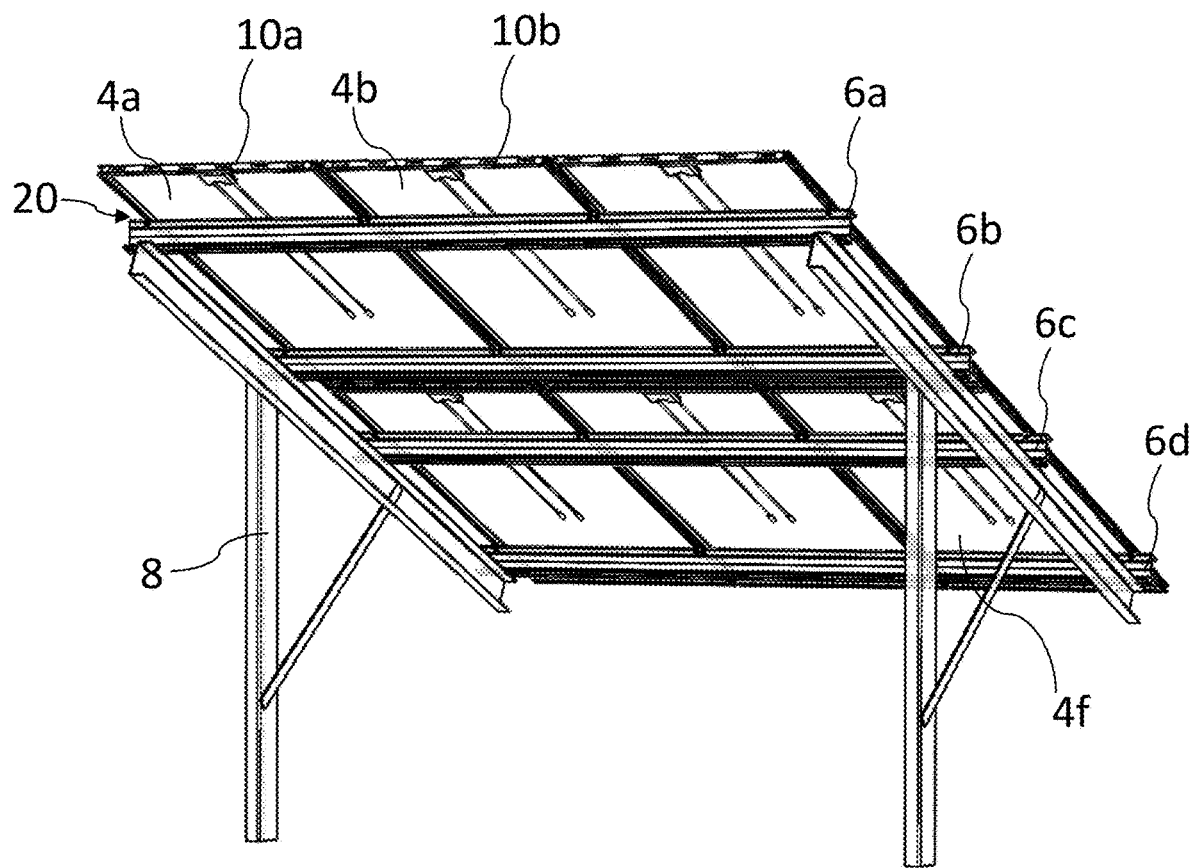
FIG. 11 depicts a photovoltaic system with multiple photovoltaic modules.

FIG. 11 depicts a photovoltaic system with six photovoltaic modules 4a, 4b, 4f. Each of the six photovoltaic modules comprises a respective frame 10a, 10b, . . . 10f and is installed on four rails 6a, 6b, 6c, 6d. The rails 6a, . . . 6d are attached to a support structure 8. The depicted photovoltaic system can be used, for example, for solar power plants to expose the multiple solar modules 4a, . . . 4f within a particular angle to the solar light. In addition, the exemplary six frames 10a, 10b, . . . 10f are mounted on the exemplary four rails 6a, . . . 6d using the mounting elements 20 as described with the other Figures above.

In other embodiments, two rows of solar modules can also be secured using only three rails, wherein, for example, the middle rail can be used to attach two neighboring solar modules onto this one middle rail. Examples for this fixation are shown in FIGS. 6A, 6B, 6C and 9.

Figure 12:
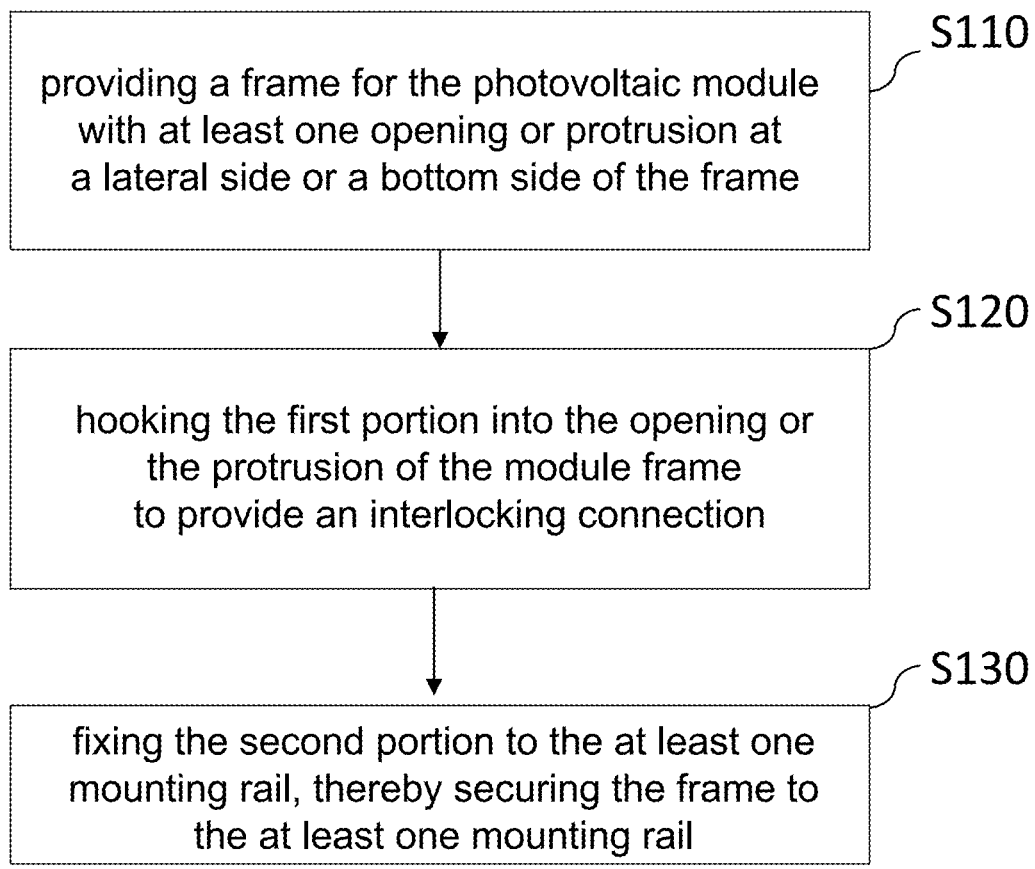
FIG. 12 depicts a flow chart for a method of mounting photovoltaic modules according to an embodiment of the present invention.

FIG. 12 depicts a flow chart of a method for mounting a photovoltaic module 4 onto at least one mounting rail 6 by using a plurality of mounting elements 120, each of them comprising a first portion 210 and a second portion 220. The method comprises the steps:

provising S110 a frame for the photovoltaic module with at least one opening 110 or protrusion 120 at a lateral side 13 or a bottom side 15 of the frame 10, the bottom side 15 being opposite to light incidence side of the photovoltaic module;

hooking S120 the first portion 210 into the opening 110 or the protrusion 120 of the module frame 10 to provide an interlocking connection; and fixing S130 the second portion 220 to the at least one mounting rail 6, thereby securing S120 the frame 10 to the at least one mounting rail 6.

Embodiments of the present invention provide the following advantages:

The photovoltaic modules 4 are installable independently from each other on mounting rail(s) 6 and can also be aligned on the mounting rails 6 independently.

There is no manual holding needed, because inserted mounting elements 20 may provide a stop so that the modules 4 do not slide off the rail system 6, 8. The photovoltaic modules hold themselves via the mounting elements that, for example, can be attached to the frame of the photovoltaic module before placing the modules 4 on the rails 6. This simplifies the installation.

It is possible to shift the photovoltaic modules horizontally during the installation along the mounting rails.

The process of installation of a group of photovoltaic modules is simplified and needs less time. For example, it is possible to install the group of photovoltaic modules without any tools which results in a fast preparation in the field. The simple installation system allows the installation of many modules within a short time.

The low degree of complexity allows several possibilities for the mounting elements.

There is a simple access of the mounting elements, because embodiments are accessible from the rear side. Thus, additional improvements in respect to conventional systems relate to the post-processing or a replacement of already installed modules, because the mounting elements are independent of each other so that a single photovoltaic module can be replaced without disconnecting any adjacent photovoltaic modules. A disconnection of one photovoltaic module can be easily done.

There is no or only a very little module-to-module gap or module-to-rail gap.

Not much material is needed for the mounting system. In particular, no clamps or intermediate mounting elements are needed to mount the modules on the rails.

The overall lifetime of the system can be increased, since the materials of all components can be the same so that a contact corrosion can be avoided.

Embodiments of the present invention are more reliable when compared to conventional clamp connections. Since there is no protrusion on the front side (due to the fixation with mounting elements from the rear side), the front side is planar and closed without any gaps or protruding clamps, no accumulation of snow is possible.

When compared to insertion systems, embodiments provide an increased load because the distance between adjacent support points is lower as well as the absent gap between the modules on the rails. In particular, the fluttering of insertion systems is not possible for the mounting system according to the present invention. Because of this, also the breaking of modules is less likely than for the insertion systems.

In contrast to conventional clamp systems, embodiments enable to manufacture the rails from steel sheets. These steel sheets allow a cost-efficient manufacturing of the rail system. In addition, the direct mounting on the rails is less complex when compared to the clamp concepts, which need a groove in the rails. In addition, since also the frame of the photovoltaic modules can be made of steel, the contact corrosion as present in the conventional systems can be avoided since all materials can be made of steel. Moreover, steel is a material which allows thin wall thicknesses but nevertheless provides sufficient stability for the installed photovoltaic modules.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

LIST OF REFERENCE SIGNS 4 photovoltaic module(s)
6 mounting rail(s)
10 frame(s)
11 support portion for the photovoltaic module
12 bent portion of the frame
13 lateral frame side
15 bottom side of the frame
20, 21, 22, . . . mounting elements
30 screw connection
108 stopper
110 opening
120 projection
120a protrusion
120b loop
210 first portion of the mounting element
210a, 210b parts of the first portion
211 cutout part
212 gap
215 opposite wing-like portions
216, 217 opposite bent edge portions
218 clinch points
219 tongue element
220 second portion of the mounting element
222 through-hole
230 latch mechanism

The invention claimed is:

1. A mounting system for mounting a photovoltaic module onto at least one mounting rail, the system comprising:
   a frame for the photovoltaic module with at least one opening formed as a through hole through the frame at a bottom side of the frame, the bottom side being opposite to a light incidence side of the photovoltaic module, the at least one opening formed as the through hole having a closed and continuous perimeter, the frame having a protrusion that is a portion on the bottom side extending parallel to the light incidence side and comprising the at least one opening; and
   a plurality of mounting elements, each comprising a first portion and a second portion for securing the frame to the at least one mounting rail, the first portion defining a hook-like engagement portion to hook into the at least one opening to provide an interlocking connection, the second portion enabling a secure fixation to the at least one mounting rail; and
   wherein the first portion of at least one of the mounting elements comprises a plate shape with a cut-out part, the cut-out part being configured to receive the portion on the bottom side of the frame upon inserting the at least one of the mounting elements into the at least one opening of the frame and rotating the at least one of the mounting elements relative to the frame.

2. The mounting system according to claim 1, wherein the frame comprises a steel material and the second portion enables a screw connection between the mounting elements and the at least one mounting rail.

3. The mounting system according to claim 1,
   wherein a first portion of another of the at least one of the mounting elements is angled relative to a second portion of the another of the at least one of the mounting elements, and is formed plate-like to hook into another of the at least one opening formed as a slit at a lateral frame side.

4. A photovoltaic assembly comprising
   one or more photovoltaic modules;
   at least one mounting rails; and
   a mounting system according to claim 1 configured to mount the one or more photovoltaic modules onto the at least one mounting rail.

5. A method for mounting a photovoltaic module onto at least one mounting rail using a plurality of mounting elements, each comprising a first portion and a second portion, the method comprising:
   providing a frame for the photovoltaic module with at least one opening formed as a through hole through the frame at a lateral side or at a bottom side of the frame, the bottom side being opposite to a light incidence side of the photovoltaic module, and the at least one opening formed as the through hole having a closed and continuous perimeter, the frame having a protrusion that is a portion on the bottom side extending parallel to the light incidence side and comprising the at least one opening;
   hooking the first portion of one of the plurality of mounting elements into the at least one opening of the module frame to provide an interlocking connection, the first portion comprising a plate shape with a cut-out part configured to receive the portion on the bottom side of the frame upon insertion of the one of the plurality of mounting elements into the at least one opening of the frame, wherein hooking the first portion into the at least one opening includes rotating the one of the plurality of mounting elements relative to the frame; and
   fixing the second portion to the at least one mounting rail, thereby securing the frame to the at least one mounting rail.

6. The mounting system according to claim 1, wherein the at least one opening formed as the through hole through the frame defines a rectangular opening.

7. The method according to claim 5, wherein the at least one opening formed as the through hole through the frame defines a rectangular opening.

* * * * *